W. C. McGEORGE.
NON-SKID DEVICE.
APPLICATION FILED APR. 2, 1919.
1,342,753.
Patented June 8, 1920.
2 SHEETS—SHEET 2.
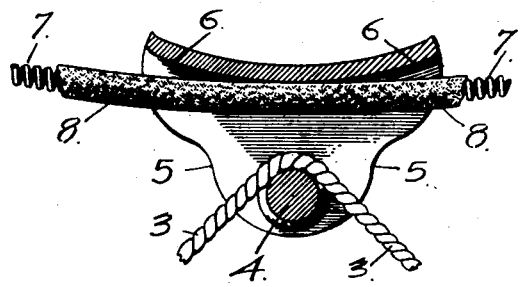
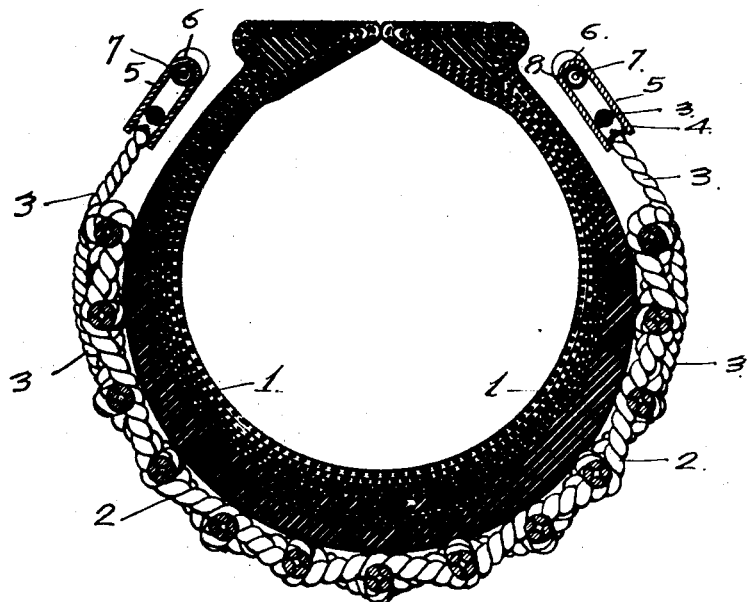
Inventor
William C. McGeorge
By Arthur L. Slee
Atty.

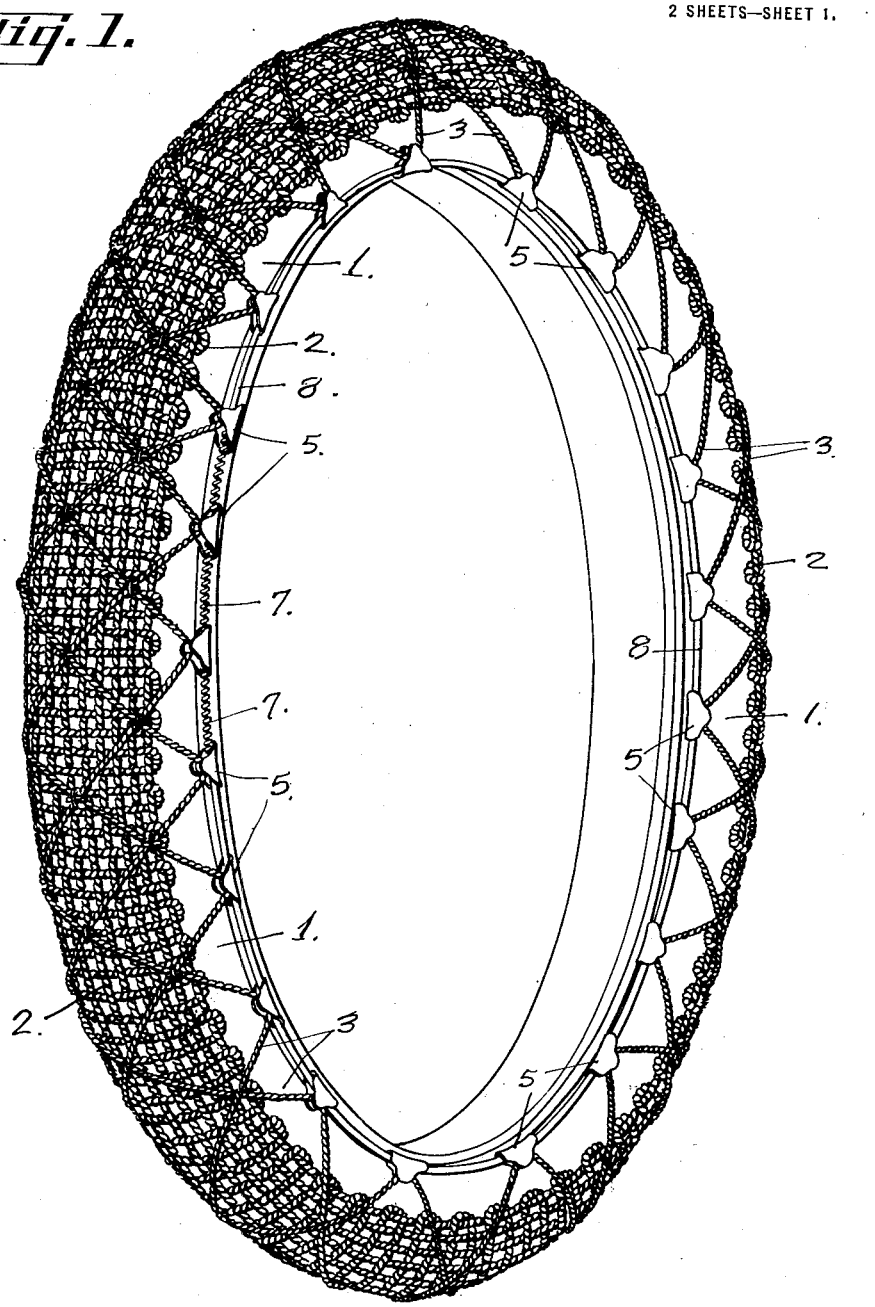

UNITED STATES PATENT OFFICE.

WILLIAM C. McGEORGE, OF SAN FRANCISCO, CALIFORNIA, ASSIGNOR OF ONE-HALF TO ROBERT T. ASH, OF SAN FRANCISCO, CALIFORNIA.

NON-SKID DEVICE.

1,342,753.    Specification of Letters Patent.    Patented June 8, 1920.

Application filed April 2, 1919. Serial No. 288,602.

*To all whom it may concern:*

Be it known that I, WILLIAM C. MC-GEORGE, a citizen of the United States, residing in the city and county of San Francisco, State of California, have invented a new and useful Improvement in Non-Skid Devices, of which the following is a specification.

My invention relates to improvements in non-skid devices for pneumatic tires and the like, wherein a mat woven from resilient cord operates in conjunction with novel retaining means; and the objects of my invention are:

First, to provide an improved non-skid device for pneumatic tires and the like;

Second, to provide an improved device of the character described which may be easily and readily applied to and removed from a tire;

Third, to provide a resilient woven mat arranged to be interposed between a tire tread and a pavement to provide a frictional engagement with the pavement; and Fourth, to provide a new and improved resilient means for holding the non-skid device in operative position, said holding means being easily and readily removable.

I accomplish these several objects by means of the preferred form of the device disclosed in the drawings forming a part of the present specification wherein like characters of reference are used to designate similar parts throughout the said specification and drawings, and in which:

Figure 1 is a perspective view of a dismounted rim and tire disclosing my improvement applied thereto;

Fig. 2 is an enlarged transverse sectional view of a tire disclosing the manner in which the mat is retained upon the tire; and Fig. 3 is an enlarged broken detailed view disclosing the manner in which the retaining means is slidably connected to the device.

Referring to the drawings the numeral 1 is used to designate a tire, and 2 is a mat preferably woven from a resilient cord or rope and arranged to surround the entire periphery of a tire tread as disclosed in Fig. 1 of the drawings.

The mat 2 is loosely held in position upon the tread of the tire 1 by means of a suitable net 3 provided with loops at regular intervals on each side thereof which loops slidably engage pins 4 within metal stirrups 5.

Each stirrup 5 is provided with an arcuate seat 6. An annular flexible member or spring 7 passes through the stirrups 5 and slidably engages the seats 6 therein. To facilitate the sliding movement of the flexible spring member 7 through the seats 6 of the stirrups 5 I have provided a flexible covering 8 for the spring member 7, which covering 8 may be made of rubber or other suitable flexible material.

The flexible nature of the member 7 will readily permit the same to be stretched a sufficient amount to permit the passage of said member and the sides or edges of the net 3 over the tread of the tire 1 in placing and removing said net.

The mat 2, being annular and resilient, may also be readily and easily placed and removed. After being placed upon the tread as disclosed in Fig. 1 of the drawings, the net 3 is placed upon the mat 2, the flexible members 7 providing sufficient tension to retain the net 3 and mat 2 in position upon the tread of the tire 1.

In this manner a resilient mat is placed between the tread and the pavement or roadway and provides sufficient traction between said roadway and tire tread to prevent skidding.

Having thus described my invention, what I claim as new and desire to secure by Letters Patent is:

1. A non-skid device for pneumatic tires and the like comprising a mat woven of a resilient material and arranged to engage the entire periphery and tread of a tire; a circumferential net arranged around the mat; and flexible means for engaging the net to hold the mat upon the tread.

2. A non-skid device for pneumatic tires and the like comprising a mat woven from resilient cords and arranged to engage the entire periphery of the tread of a tire; a circumferential net arranged around the mat; and flexible means for engaging the net to hold the same and the mat upon the tread.

3. A non-skid device for pneumatic tires and the like comprising a mat woven from resilient cords and arranged to engage the entire periphery of a tire tread; a circumferential net arranged around the mat; and flexible means arranged on each side of the tire and slidably engaging the net at regular intervals to hold said net and mat on the tread.

In witness whereof I hereunto set my signature.

WILLIAM C. McGEORGE.